United States Patent Office 3,334,944
Patented Aug. 8, 1967

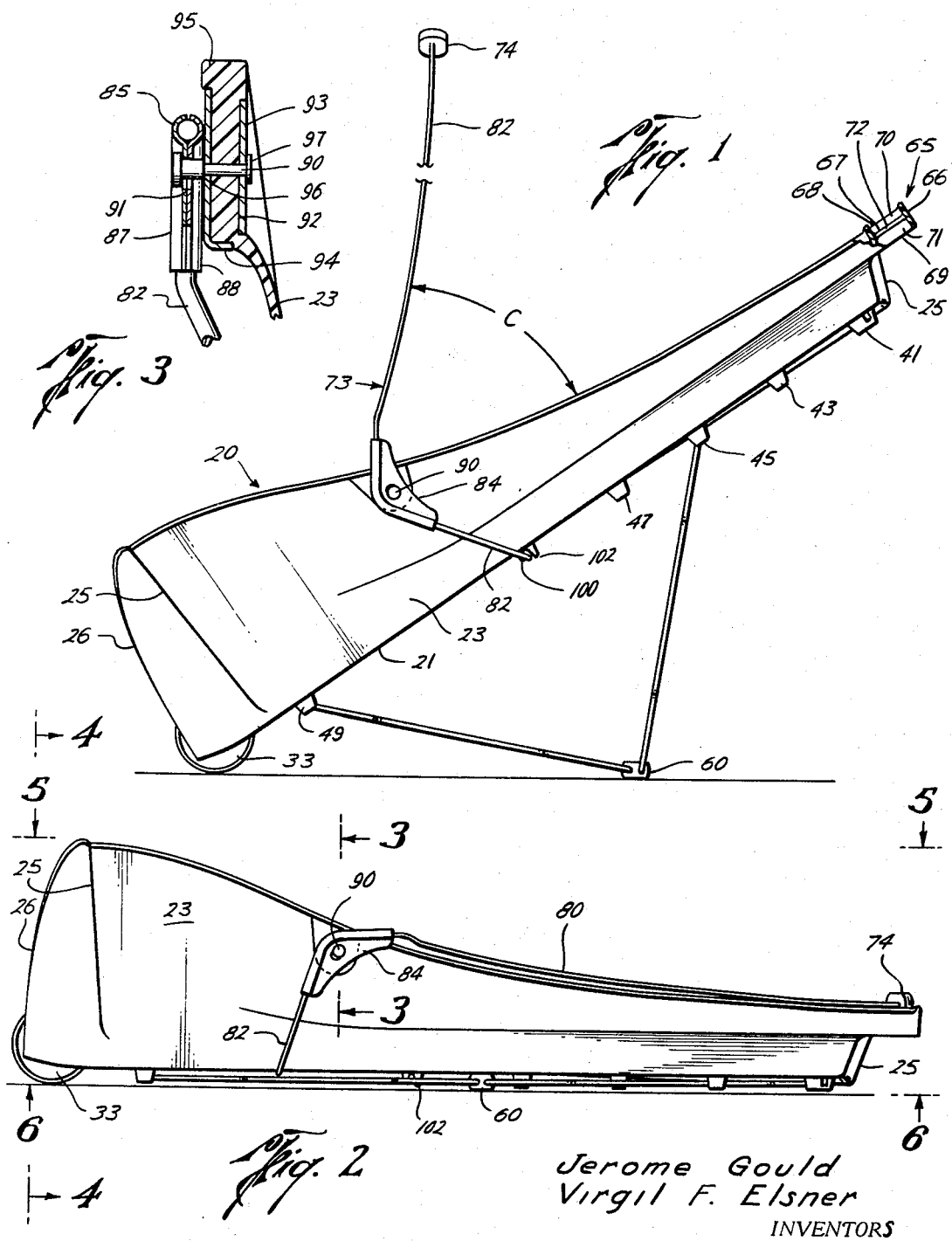

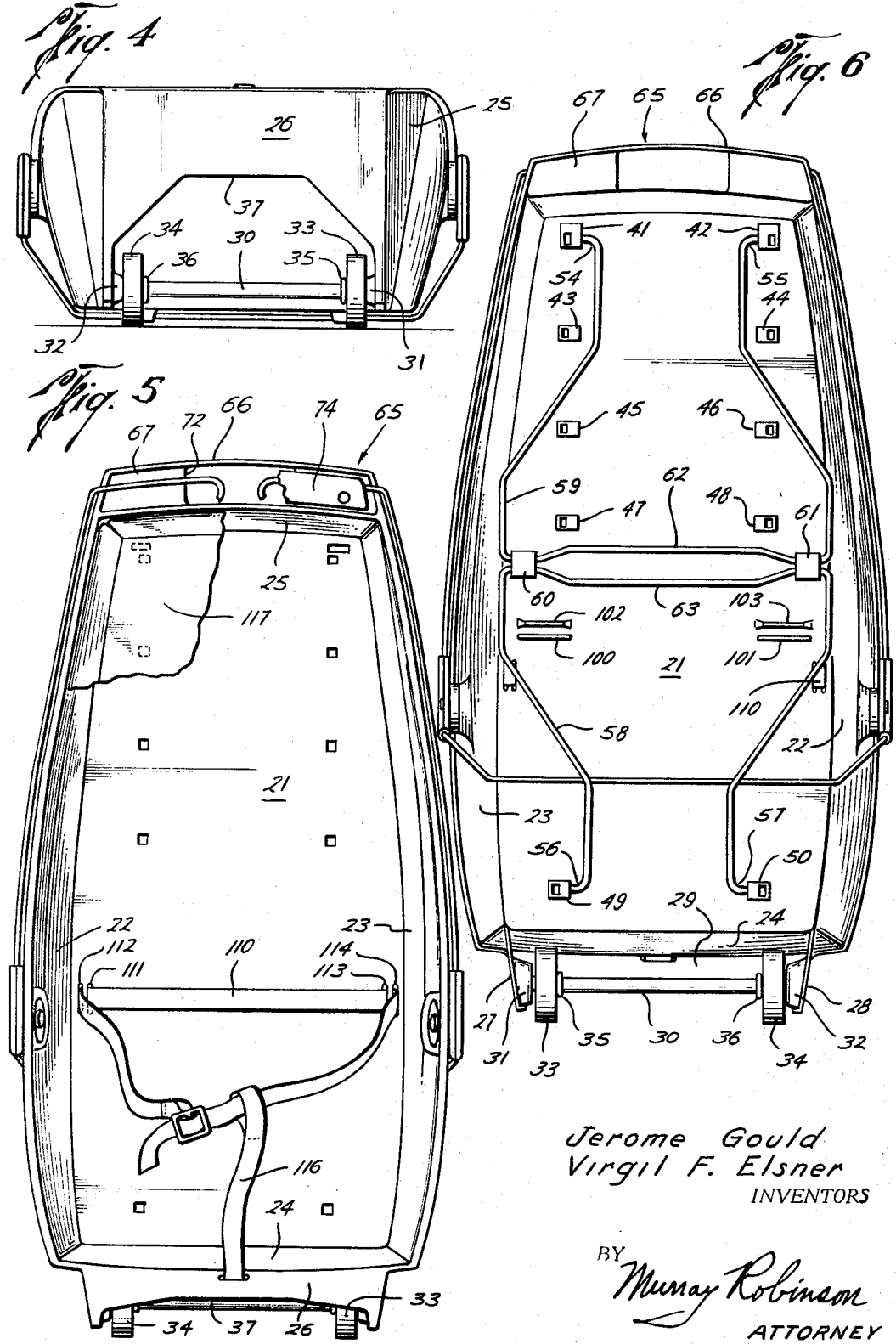

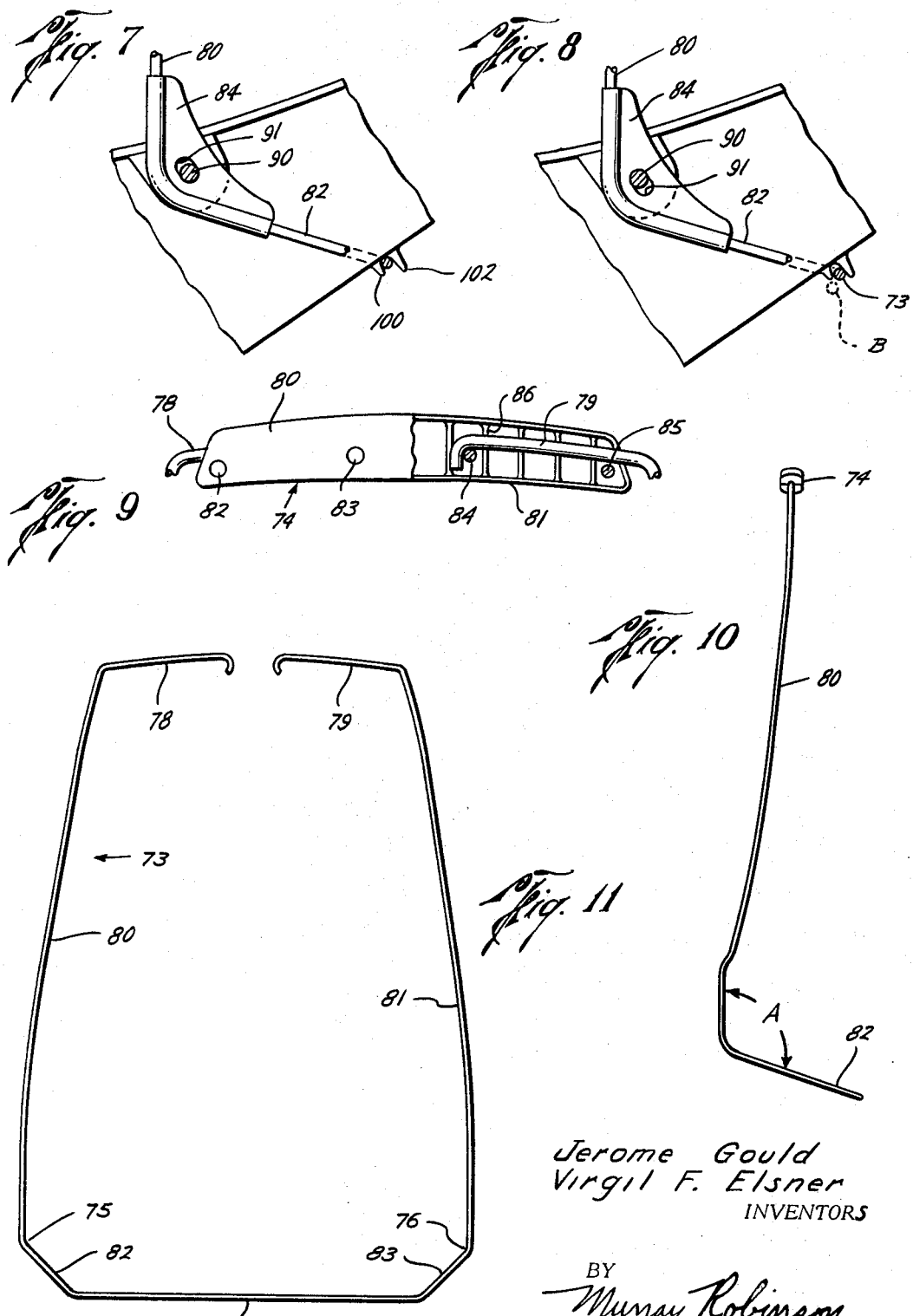

3,334,944
BABY CARRIER
Jerome Gould, Encino, and Virgil F. Elsner, Manhattan Beach, Calif., assignors to Infanseat Company, Eldora, Iowa, a corporation of Iowa
Filed May 24, 1965, Ser. No. 459,148
12 Claims. (Cl. 297—377)

ABSTRACT OF THE DISCLOSURE

A baby carrier shell with a bail that is pivotally attached to the shell; said bail having a handle portion that removably fits within a recess provided said shell, said bail further having a transverse bar interlocking with lugs provided the back of said shell to fix said bail to said shell.

---

This invention pertains to baby carriers. Apparatus of this general type is shown in patents 2,324,421—Ouellette (1943)
2,346,989—O'Brien (1944)
2,661,959—Bell (1953)
3,101,972—Laughlin (1963)

It is the principal object of the invention to provide a baby carrier including a bail by means of which the baby carrier can be carried in one hand, the bail being locked against pivoting relative to the carrier when in use so as to provide maximum control of the carrier by the porter, the bail being retractable when desired to position it out of the way where it will not interfere with the baby's movements nor with the access of the attendant to the baby, especially during feeding.

Other objects and advantages of the invention will become apparent from the following description thereof.

Briefly the invention includes a bail pivoted to the sides of the carrier and having an extension passing down the sides and underneath the carrier, the extension being releasably engageable with stop means formed on the bottom of the carrier to prevent rotation of the bail relative to the rest of the carrier. To enable the extension to be released from the stop means, the bearings of the bail pivots are elongated in the generally vertical direction (considering the bail in position for use) so that when the carrier is set down the weight of the bail shifts the bearing downwardly relative to the pivots on the carrier shell, in which position the bail extension can be forced past the stop means allowing the bail to be folded down flat against the carrier shell out of the way. A hand grip on the bail is received in a recess in the carrier. The recess has a hole in its bottom through which the attendant's fingers may pass to push the hand grip up when it is desired to reposition the bail in position for use. After the bail has been elevated to the use position, when the bail is lifted the weight of the carrier shifts the pivots downwardly relative to the elongated bearings of the bail, thus locking the bail extension against the stop means. The same relative motion that locks the bail against rotation also transfers some of the load from the pivots and bearings to the bail extension under the shell of the carrier.

For a detailed description of a preferred embodiment of the invention reference will now be made to the accompanying drawings wherein;

FIGURE 1 is a side view of a baby carrier embodying the invention;
FIGURE 2 is a view similar to FIGURE 1 showing the carrying bail retracted and the carrier laid on its back;
FIGURE 3 is a section taken at plane 3—3 of FIGURE 2;
FIGURE 4 is a bottom view of the carrier, taken on plane 4—4 of FIGURE 2;
FIGURE 5 is a front view of the carrier taken on plane 5—5 of FIGURE 2;
FIGURE 6 is a back view of the carrier taken on plane 6—6 of FIGURE 2;
FIGURE 7 is a fragmentary view similar to FIGURE 1 but with the head of the pivot cut away to show the relative positions of slot and pivot when the carrier is supported by the bail;
FIGURE 8 is a view similar to FIGURE 1 showing the relative positions of the slot and pivot when the bail is supported by the carrier;
FIGURE 9 is an enlarged fragmentary view of the handgrip of the bail, partially in section;
FIGURE 10 is a side view of the bail alone; and
FIGURE 11 is a front view of the bail without the handgrip.

Referring now to FIGURES 1 through 6 there is shown a baby carrier including a tub shaped shell 20, preferably molded of a resilient plastic material such as polyethylene or polyurethane. If desired the shell may be perforated for weight reduction, conservation of material, ventilation, and ornamental appearance. As best shown in FIGURES 5 and 6 the shell includes a back 21, sides 22, 33, bottom 24, and top 25. The sides converge somewhat at the top so that the top is narrow to limit the baby's head laterally while the bottom is wide enough to receive the baby's hips when padded with diapers and pants and the mid portion is wide enough to receive the baby's shoulders. As best shown in FIGURES 1 and 2, the sides of the carrier are deepest adjacent the bottom of the carrier and shallower at the top, thereby enabling the baby to extend its arms out over the sides of the carrier and to look out over the sides.

Extending rearwardly from the front edge of the shell at an acute angle to bottom 24 is a veil 26. As best shown in FIGURE 6 bottom 24 and veil 26 are joined at their sides by walls 27, 28 forming therewith a rearwardly opening pocket 29. Sockets 30, 31 formed on the inner surfaces of walls 27, 28 receive the ends of axle 30 on which are rotatably mounted wheels 33, 34. Enlargements 35, 36 on the axle prevent the wheels from moving inwardly along the axle. The veil 26 is cut out at 37 so that the walls 27, 28 can be sprung apart enough to admit the axle 30 during assembly and then allowed to snap back to hold the axle in place.

As best shown in FIGURE 6, on the back of the shell are a plurality of pairs of laterally aligned bosses 41–42, 43–44, 45–46, 47–48, 49–50. Each boss has a socket formed on its inward side adapted to receive when desired one of the outturned pin ends 54, 55, 56, 57 at the ends of U-shaped resilient steel rods 58, 59. The rods are double pivotally connected by two blocks 60, 61 each block having a pair of holes therethrough in which adjacent portions of the two rods are rotatably received. Central portions 62, 63 of the rods are displaced out of alignment with the portions of the rods in the blocks so as to form shoulders preventing lateral shifting of the blocks.

In FIGURES 2 and 6 the rods 58, 59 are shown positioned flat against the bottom of the carrier, pins 54–57 being received in the sockets 41–42 and 49–50 nearest the top and bottom of the carrier. In this position the rods are out of the way as is desirable when the carrier is to be held in the arms of the baby's attendant. By squeezing together the arms of U-shaped rod 59 its pin 54, 55 can be released from sockets 41–42 and reinserted in another pair of sockets such as sockets 45–46, thereby positioning the rods 58, 59 to form a support stand as shown in FIGURE 1. If it is desired to increase the angle of the back of the carrier relative to the horizontal, the rod pins 54, 55 can be placed in sockets 47, 48, or if a lesser angle is desired the pins can be placed in sockets 43, 44 on the back of the carrier.

When the carrier is supported by the stand the blocks 60, 61 adjust themselves to rest flat on the floor. The blocks 60, 61, together with wheels 32, 33 provide four points of support for the carrier. If it is desired to move the carrier on the floor, the top end of the carrier can be grasped to lift the blocks 60, 61 off the floor, thereby placing all of the weight on the wheels, and the carrier can then be rolled to the desired position and set down again on the blocks 60, 61. To facilitate lifting the carrier at its upper end and pulling or pushing it to the desired new location, a gripping means 65 is formed adjacent the top 25.

As best shown in FIGURES 1, 5, and 6, the gripping means 65 comprises a U-shaped plastic strap 66 integral with the rest of shell 20. A web 67 extends from top 25 in a plane parallel to the back 21 of the carrier inside strap 66 midway between the front and back edges 68, 69 thereof, forming front and back channels 70, 71. Additionally, there is a laterally elongated opening 72 in web 67, the opening 72 being about the width of four fingers of a human hand. With this arrangement, when the carrier is in the position shown in FIGURE 1, the attendant can grasp the gripping means 65 from either the front or back with the fingers passing into opening 72. If the bail 73 of the carrier is retracted, with its handgrip 74 received in pocket 70, the gripping means 65 can be conveniently engaged by the attendant placing his fingers in the back channel 71 and his thumb on top of handgrip 74. When it is desired to elevate the bail, the attendant can push his fingers up through opening 72 to force the handgrip 74 out of channel 71 into position where handgrip 74 can be easily grasped.

As best shown in FIGURES 9–11, the bail 73 comprises a steel rod formed of two bell cranks 75, 76 joined at one end by transverse bar 77 and provided at the other end with interned L-shaped pins 78, 79. The handle 74 is formed of two hollow plastic halves 80, 81 connected by rivets 82, 83, 84, 85. The ends of L-shaped pins 78, 79 engage inside rivets 83, 84 to prevent the pins from being pulled out of the holes 85 at each end of the handle. Internal webs 86 strengthen the handle without unduly increasing its weight.

At the angles between the upper arms 80, 81 and lower arms 82, 83 of the bell cranks there are gussets 84 (see FIGURES 1 and 2). As best shown in FIGURE 3, each gusset includes two parts. Each part includes a flat web part and a semitubular part. The semitbular parts 85, 86 fit over the bail rod and the flat webs 87, 88 are spot welded together. The bail 73 is rotatably mounted on pivots 90 formed by rivets passing through the sides 22, 23 of the carrier and through elongated openings or slots 91 in the gussets 84 on the bail (see FIGURES 7 and 8). The openings are elongated in a direction perpendicular to the back when the bail is in position for carrying.

Referring now particularly to FIGURE 3, the portions 92 of the sides of the carrier through which pass pivots 90 are thickened to provide sufficient strength to hold the pivots. The thickened portions 92 lie in planes parallel to each other and perpendicular to the back so that the pivots 90, which are perpendicular to the portions 92, may be coaxial to prevent binding of the bail as it rotates from one position to another. The portions 92 thus lie at a slight angle to the sides 22, 23 which converge toward the back of the carrier.

For added strength a metal washer 93 is disposed over the inner face of thickened portion 92 and a cap 94 is disposed over the outer face of portion 92 underneath bead 95 that extends along the front edge of the sides of the carrier. The pivot 90 is in the form of a metal rivet and includes a shoulder 96 which bears against cap 94, the inner end of the rivet being deformed to a flange 97 bearing against the washer 93. The rivet is thus fixedly mounted against cap 94 and washer 95 which distribute bending moments and axial stresses on the pivot through a large area of the thickened portion 92 of the plastic shell of the carrier. Also, the caps 94 distribute to the beads 95 some of the load transverse to the pivots 90. By these means no stress is imposed on the shell in excess of the strength of the plastic in ordinary use of the carrier.

When the bail 73 is in the retracted position shown in FIGURE 2, the transverse bar 77 lies across the back of the carrier closely adjacent thereto so as not to prevent the support stand 58–61 from being positioned substantially flat against the back of the carrier. The angle A (FIGURE 10), between the upper and lower arms of the bell cranks is such that when bar 77 of the bail is flat against the back of the carrier, the handgrip 74 is nested in pocket 70 at the top of the carrier.

Referring to FIGURES 1, 7, and 8, when the bail 73 is first elevated the weight of the bail causes it to move down to the limit allowed by slots 91, the tops of the slot resting on pivots 90. At this time the transverse bar 77 will be in the position shown in dotted lines at B in FIGURE 8 bearing against the bottoms of transverse ribs 100, 101 (see also FIGURE 6) on the back of the carrier. With a slight pressure the bar can be forced past ribs 100, 101 into the solid line position shown in FIGURE 8. In this position the bar lies in the recess formed between ribs 100, 101 and ribs 102, 103 parallel to ribs 100, 101. Ribs 102, 103 are of greater height than ribs 100, 101 so that the bar 73 cannot be forced past ribs 100, 101. In this manner bar 73 is snapped into a locked position between ribs 100, 101 and ribs 102, 103 which constitute a releasable locking means.

When the bail 73 is lifted to pick up the carrier, the bail first moves up relative to the carrier shell to the position shown in FIGURE 7. In this position the bar 77 is in contact with the back of the carrier so that it can take some of the weight of the carrier when it is lifted off the floor. At the same time the pivots 90 are in engagement with the bottoms of the slots 91 so that some of the weight of the carrier is taken by the gussets 84 and pivots 90.

By reversing the procedure just described the bail 73 can be rotated to the retracted position. When the carrier is set down the weight of the bail causes the bail to move to the FIGURE 8 position. If it does not move automatically a slight downward pressure on the bail will move it to the FIGURE 8 position. Thereafter the bail can be rotated clockwise to force bar 77 past ribs 100, 101 and then returned to the FIGURE 2 position.

It is to be noted that the angle A between the upper and lower arms of the bell cranks of the bail is such that when the bar 77 is in the recess between ribs 100, 101 and 102, 103 and against the back of the carrier as shown in FIGURES 1 and 7, the upper arms of the bell cranks are nearly perpendicular to the plane defined by the wheels 33, 34 and blocks 60, 61 when the support stand is adjusted as shown in FIGURE 1. Thus, when the carrier is resting on the floor supported by the stand adjusted to its intermediate position as shown in FIGURE 1, the upper arms of the bell cranks of the bail are approximately vertical. If the stand is adjusted to position the back of the carrier at a greater or lesser inclination, the upper arms of the bail bell cranks will still be near to vertical. The handgrip 74 is thus always disposed at near maximum height when the bail is upright, thereby making it easy to pick up the carrier without much stooping. To achieve this result the angle A of the bell cranks must substantially be equal to ninety degrees plus one-half the angle C (FIGURE 1) between vertical and the position of the upper part of the bail in retracted position when the carrier is setting on the floor with the stand in the intermediate position.

If the carrier is lifted off the floor, the center of gravity of the carrier and baby will usually be such as to put the upper arms of the bell cranks in near vertical position. Therefore, there will be little or no rocking of the carrier when it is lifted off the floor or set down if the stand is in the intermediate position shown in FIGURE 1. It is to be noted that this result is not due to the fact that the upper arms of the bail bell cranks are vertical in both cases but rather that they are in the same position both with the carrier off the floor and on the floor that prevents the rocking motion. If it is found that with a particular baby the bail is at an angle to the vertical when lifted off the floor, e.g. inclined upwardly rearwardly, the stand can be adjusted to another position, e.g. to a lesser angle to the horizontal so as to eliminate rocking at take off and set down.

When the carrier is off the floor, the shell of the carrier, if supported by the bail solely at pivots 90, would be unstable, being free to rock forward or backward. The transverse bar 77, however, engaging the back of the carrier, positively prevents backward rocking of the shell. The ribs 100, 101 engage the bar 77 to positively prevent forward rocking of the shell. The importance of the bar 77 and the locking thereof above ribs 100, 101 is thus apparent.

It is also to be noted that since the shell of the carrier is supported both forwardly by pivots 90 and rearwardly by transverse bar 77, so long as the center of gravity of the shell and baby lies between vertical planes through pivots 90 and bar 77 there is no tendency at all for the shell to rock forwardly or backwardly, and the pivots 90 and bar 77 are so placed on the carrier as to insure that normally the center of gravity of the carrier and baby does lie therebetween.

With the shell of the carrier rigidly positioned relative to the bail, it remains only to anchor the baby to the shell. This is accomplished by means of waist strap 110 passing through slots 111, 112, 113, 114 and connected at its ends by buckle 115. Also, there is a crotch strap 116 passing through slot 117, secured behind the veil by a suitable enlargement. At the upper end of the crotch strap is a loop 116 through which passes the waist strap. For the baby's comfort a pad 117 (shown only in part) may be provided inside the shell covering the back, bottom, top and parts of the sides.

While a preferred embodiment of the invention has been shown and described, many modifications thereof can be made by one skilled in the art without departing from the spirit of the invention.

That being claimed is:

1. A baby carrier including a shell having back, sides and bottom; a bail pivotally connected to the sides of the shell, said bail including arms extending back along the sides of the shell joined by a transverse bar behind the shell; releasable means to lock the bail in position with the bail extending forwardly from the sides of the shell, said releasable means comprising projections on the back of the shell past which said transverse bar can be forced; the pivotal connection between said bail and said shell sides including means for permitting the bail portion of said pivotal connection to move transversely of said shell sides wherein there is sufficient play in the pivotal connections between the bail and shell to allow the transverse bar to be moved against the back of the shell after it has passed over said projections.

2. A baby carrier including a shell having back, sides and bottom, a bail pivotally connected to the sides of the shell, said bail including arms extending back along the sides of the shell joined by a transverse bar behind the shell; said bail having a handgrip at the top thereof and said shell includes a top and a pocket extending upwardly from said top adapted to receive said handgrip when the bail is laid down against the sides of the carrier, wherein said pocket comprises a strap extending up from the top of the shell and a web extending parallel to the back of the shell from the top of the shell inside the strap behind the front edges of the strap, said web having an opening therethrough to enable the handgrip to be pushed forward from the rear of the carrier.

3. Combination according to claim 2 including wheels at the juncture of back and bottom of the shell and said web being located forwardly of the rear edges of said strap forming a second pocket behind the web, said second pocket forming a handgrip, to facilitate rolling said carrier on said wheels.

4. A baby carrier including a shell having back, sides and bottom, a bail pivotally connected to the sides of the shell, said bail including arms extending back along the sides of the shell joined by a transverse bar behind the shell, wherein said bail comprises a single rod formed to include two bell cranks, said arms being the lower arms of said bell cranks, said arms being joined at their lower end by said transverse bar, the upper arms of the bell cranks together with inturned pins on the upper ends thereof forming the rest of the bail, said pins being connected together by a handgrip preventing the upper arms of the bell cranks from being separated.

5. Combination according to claim 4 including a gusset at the angle of each bell crank, said bail being pivotally mounted on said shell by pivots each passing through openings in one of said gussets.

6. Combination according to claim 5 wherein said opening in each gusset is elongated in a direction perpendicular to the back of the carrier when the bail is in an upright position, whereby when the bail is upright some of the weight of the shell is taken by the transverse bar.

7. Combination according to claim 5 wherein the sides of the shell converge going from front to back and include thickened portions disposed in parallel planes perpendicular to the back, said pivots being coaxially disposed in said thickened portions in the sides of the carrier with their axes perpendicular to the planes of said thickened portions.

8. In a baby carrier, the combination of:
a shell having a back, bottom, sides and top;
a support stand selectively engageable with a plurality of connectors on said shell whereby the angular position of said shell with respect to a surface against which said shell is positioned is a function of the position of said connectors with which said stand is engaged, one of said positions resulting in said stand being planar with and resting adjacent said back; and
means for transporting said carrier, said transporting means including a bell crank having sides and a hand grip portion linking one end of said crank sides, said crank sides being pivotally linked to said shell and a connecting member linking the opposite end of said crank sides, said connecting member being transverse of said back, said transverse member being engageable with said back in a plurality of positions.

9. The combination of claim 8, wherein said hand grip is engageable with said shell when said connecting member is in only one of said plurality of positions.

10. The combination of claim 8 wherein said connecting member is at all times intermediate said shell and said support stand.

11. The combination of claim 10, wherein said back includes means for releasably locking said connecting means when said connecting means is in another of said positions.

12. The combination of claim 9 wherein when said connecting means is in said only one position, said hand grip is received in a pocket formed in said shell.

References Cited

UNITED STATES PATENTS

| | | | |
|---|---|---|---|
| 1,267,948 | 5/1918 | Wiley | 16—126 |
| 2,990,190 | 6/1961 | Eriksen | 280—47.25 X |
| 3,101,972 | 8/1963 | Laughlin | 297—310 X |

FOREIGN PATENTS

| | | |
|---|---|---|
| 621,939 | 12/1962 | Belgium. |
| 944,081 | 12/1963 | Great Britain. |

BENJAMIN HERSH, *Primary Examiner.*

MILTON BUCHLER, *Examiner.*

J. A. PEKAR, *Assistant Examiner.*